Jan. 4, 1927.

J. KUHNE 1,612,824

CONNECTING ROD BEARING

Filed Sept. 24, 1925    2 Sheets-Sheet 1

Inventor:
Joseph Kuhne

Jan. 4, 1927.

J. KUHNE 1,612,824

CONNECTING ROD BEARING

Filed Sept. 24, 1925   2 Sheets-Sheet 2

Inventor;
Joseph Kuhne

Patented Jan. 4, 1927.

1,612,824

UNITED STATES PATENT OFFICE.

JOSEPH KUHNE, OF ISERLOHN, GERMANY.

CONNECTING-ROD BEARING.

Application filed September 24, 1925, Serial No. 58,424, and in Germany September 23, 1924.

The invention relates to the connection of the connecting-rod with the reciprocating press-carriage in machines for manufacturing rivets, screws, wire-nails, balls and the like of the kind in which the connecting-rod is journalled on the carriage by means of two side journals and is simultaneously supported on the carriage by means of the front face of its bearing end. The invention consists essentially in that the cylindrically shaped front face of the bearing end of the connecting-rod is curved to the same radius as the outer surfaces of the journals so that the latter as well as the connecting-rod itself are journalled and supported in a continuous bearing of uniform width. The result is thereby obtained that, on the one hand, the head of the connecting-rod and the rear portion of the carriage which receives and supports it may be of particularly small dimensions and, on the other hand, the construction of the rear portion of the carriage is facilitated in that the bearing which is provided in it for the head of the connecting-rod need neither be reduced in size nor need its ends be fitted with separate journal-rings or bushes for the bearings of the connecting-rod journals. In order that the rear portion of the carriage need not be divided for the introduction of the connecting-rod, the two journals of the connecting-rod are made, according to the invention, in two parts separate from the connecting-rod and fitted to it from opposite sides. The result is thereby also obtained that the lining which is arranged in the bearing and extends in common over the two journals and the front surface of the head of the connecting rod may be made in one piece. My invention aims to provide a full bearing for the head of the connecting rod which is not only of greater length than the width of the head of the rod, and which extends also from side to side of the member to which the rod is coupled but in which the sectional wrist-pin employed includes as part thereof the two end bearing members, and consists of a minimum number of complemental parts, preferably not more than two, in order to reduce the cost of construction and the amount of working time necessary in assembling or disassembling a bearing. My invention further aims to make the construction of the bearing such as to avoid the necessity of forming a connecting bearing rod eye of excessive size or wall thickness, while at the same time so constructing the wrist-pin that the eye will embrace a portion of the pin which is of substantial thickness, in order that the pin will be of sufficient strength to resist fracture or deflection under pushing and pulling strains, and will be so reinforced and braced as to ensure a smooth and true working of the parts of the bearing surfaces against one another.

Two constructional embodiments of the invention are illustrated by way of example in the accompanying drawings in which.

Figure 1:
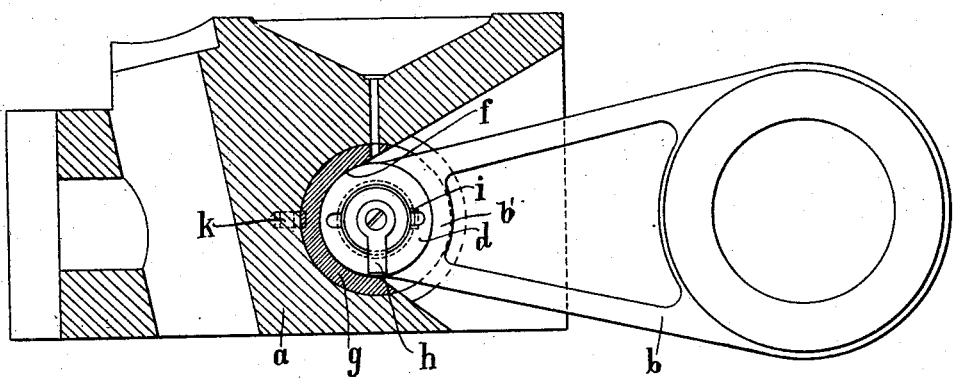
Figure 1 is an elevation, partly in section, showing one form of the invention.

Referring to the drawings, $a$ represents the reciprocating carriage of the press and $b$ the connecting-rod by which it is moved and which, in manner known per se, is journalled by means of two end bearing members or journals $c$, $d$ in the carriage $a$, of which the rear end is partly forked. In order that the pressure may be transferred to the carriage $a$ directly by means of the connecting-rod as well as by the journals the front face $f$ of the bearing eye $b'$ of the connecting-rod $b$ is of cylindrical shape and is supported against an approximately semi-cylindrical recess in the carriage $a$. The front face $f'$ of the connecting-rod is curved to the same radius as the outer surfaces of the end bearing members or journals $c$, $d$ whereby the result is obtained that the supporting surface for the arm of the connecting-rod can be formed, as illustrated, directly by the central portion of the wall of the transverse bore or bearing in the carriage which holds the journals $c$, $d$, which bore only needs to possess an opening for the passage of the connecting-rod in that half which is adjacent to the rear end of the carriage while the other half may on the contrary remain unbroken. The transverse bore or bearing in the carriage is provided as usual with a bushing or lining $g$ which not only surrounds the journals but also extends over that portion of the bore in the carriage which forms the supporting surface for the connecting-rod.

In order that the rear portion of the carriage $a$ containing the bearing for the connecting-rod need not be divided for the purpose of introducing the connecting-rod $b$ and its journals $c$, $d$, and in order also that a lining or journaled-box $g$ which is made in only one piece may be employed, the two journals are formed in two parts which are separate from the connecting-rod and are fitted on to it from opposite sides. In the example illustrated in Figs. 1 and 2 the connecting-rod is provided on one side with a solid journal $c$ having a reduced stem or pin portion $c^1$ which engages in and is tightly fitted in the circular bore of the connecting-eye, while the journal $d$ on the other side consists of a ring having an internal thread which is screwed on to the externally threaded end $c^2$ of the stem $c'$ which projects out of the connecting-rod. In order to prevent the screw connection from unintentionally becoming loose a locking device of a type well known per se is provided which consists, for example, of a tongue $h$ which is fixed by means of a screw to the end $c^2$ of the journal $c$ and engages also in recesses in the journal $c$ and the ring $d$.

In order also to prevent the journals $c$, $d$ from rotating there is fitted a key $i$ which engages in grooves in the wall of the bore in the connecting-rod $b$ and in the reduced portion $c^1$ of the journal $c$. The lining $g$ is likewise prevented from rotating in the bore of the carriage $a$ by means of a key $k$ which is similarly arranged.

The construction above-described provides a wrist-pin consisting of end bearing members $c$, $d$, and a reduced intermediate portion $c'$ connecting said members, which portion $c'$ receives and is surrounded by the eye $b'$ of the connecting rod $b$, which eye lies between the bearing members $c$ and $d$. In order to provide a wrist-pin consisting of but two parts, as described, and which is sufficiently strong to resist deflection under the working movements of the connecting rod $b$, the stem $c'$ is formed integral with the bearing member $c$, and while of reduced diameter with respect to both bearing members, is yet of fairly large diameter so that a connecting stem of adquate strength between the two bearing members will be produced. The eye $b'$ of the rod $b$ is of a wall thickness materially less than the diameter of the stem $c'$ and is of a wall thickness corresponding to the difference between the diameter of the stem and the end bearing members, so that the outer surface of the eye will lie flush with the outer surfaces of the end bearing members and form therewith a continuous bearing surface of the same radius throughout the length of the bearing for contact with the bearing surface of the bushing $g$. As in practice the eye of the connecting rod may be made of comparatively thin wall thickness, because of the extent of the bearing surface, the reduced portion of the wrist-pin extending between the bearing members $c$ and $d$ may be made of such diameter as to afford the necessary strength against its deflection under pressures and strains in the motion of the connecting rod, whereby the bearing members $c$ and $d$ are reinforced, which action is supplemented by the bearing contact of the eye $b'$ in the bearing surface of the bushing, so that tilting or canting of the bearing members $c$ and $d$ in the bushing will be prevented, an accurate centering of the bearing surfaces maintained, and unequal wear on such surfaces avoided.

Figure 2:
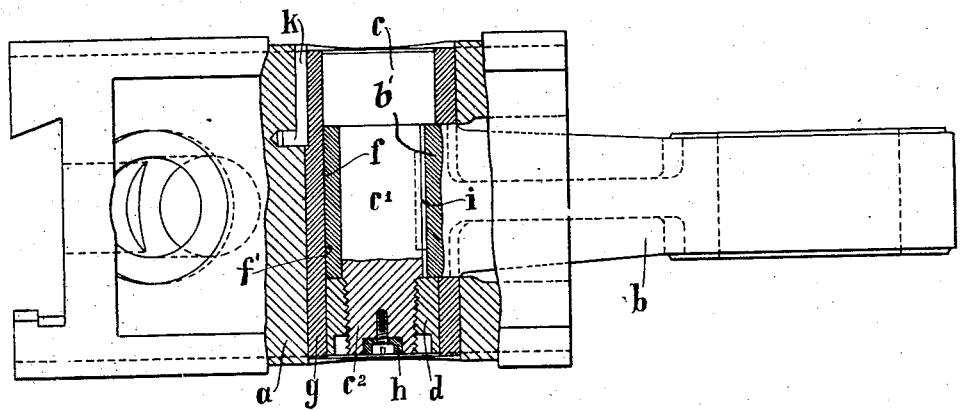
Figure 2 is a plan view, partly in section, of the same.
Figure 3:
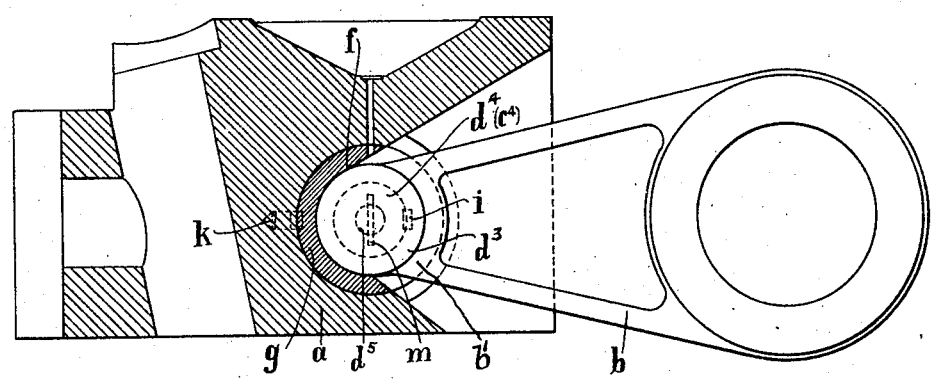
Figure 3 is a view similar to Figure 1 showing a modified construction.
Figure 4:
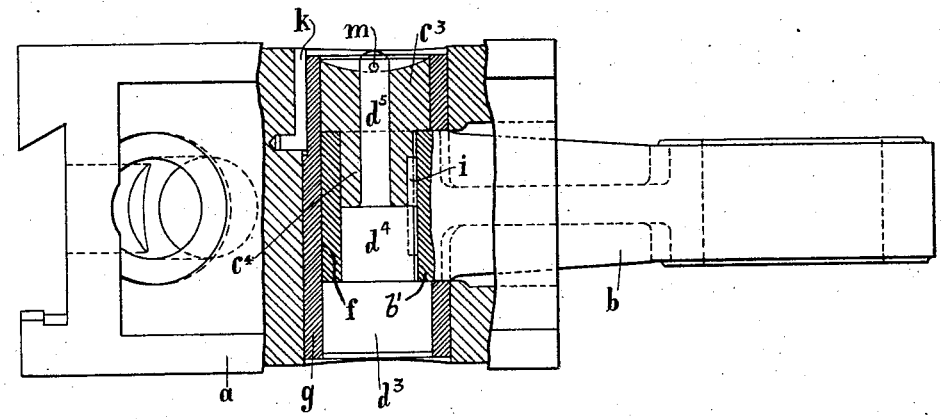
Figure 4 is a view similar to Figure 2 of the modification shown in Figure 3.

The example illustrated in Figs. 3 and 4 is simpler than that of Figs. 1 and 2 in that the screw connection of the two journals is omitted. In this case both end journals or bearing members $c^3$—$d^3$ have reduced ends or stem portions $c^4$—$d^4$ which extend from opposite sides into the tranverse bore in the connecting-rod $b$ and are interlocked therewith by means of a groove and a spring or key $i$. One of the journals, as the one $d^4$, is provided with an axial pin-like extension $d^5$ which projects into and engages a longitudinal recess in the other journal $c^3$ and is provided at its end, which lies outside the latter journal, with a hole in which a split pin or cotter $m$, which connects the two journals together in the axial direction, is inserted. As a result of this construction, it will be seen that a two-part wrist-pin is provided consisting of the end bearing members $c^3$—$d^3$ having a reduced portion formed by the stems $c^4$—$d^4$, which are bridged and surrounded by the bearing eye of the connecting rod $b$, together with a projection or fastening element $d^5$ integral with and projecting from the bearing member $d^3$ and extending through the stem $c^4$ and body of the bearing member $c^3$. The stems $c^4$ and $d^4$ form a reduced intermediate portion of the wrist-pin which is of comparatively large diameter, conformable with that of the stem $c'$ of the bearing member $c$ shown in Figures 1 and 2, and of sufficient diameter to enable a locking projection $d^5$ of sufficient diameter for a firm interlocking connection between the two coupling members to be formed. By this construction also a wrist-pin having all the advantages of that disclosed in Figures 1 and 2 is produced, in which a strong and durable construction of two-part wrist-pin is provided to sustain the working strains, to reinforce and brace the eye of the connecting rod and to hold the end bearing members against deflection so that an accurate engagement between the bearing surfaces of the carriage $a$ and connecting rod $b$ will be maintained.

Obviously, various other forms of construction are possible without departing from the invention.

Having now particularly described and ascertained the nature of my said invention, and in what manner the same is to be performed, I declare that what I claim is:—

1. In a connecting rod bearing, a member having a bore extending between opposed faces thereof and provided with a bearing surface, a two-part wrist-pin arranged within said bore and presenting opposite end bearing members and a reduced intermediate portion, one part of said pin including a connecting element extending through and interlocked with the other part of said pin, and a rod having an eye surrounding and interlocked with the reduced intermediate portion of the pin and lying between the end bearing members thereof, said eye having a wall thickness materially less than the diameter of the reduced portion of the wrist-pin which it encloses, said end bearing members and eye presenting a continuous outer bearing surface of like radius throughout for engagement with the bearing surface of the bore.

2. In a connecting rod bearing, a member having a bore extending between opposed faces thereof and provided with a bearing surface, a two-part wrist-pin arranged within said bore and presenting opposite end bearing members and a reduced intermediate portion, said reduced intermediate portion consisting of complemental reduced extensions of said end bearing members, the extension of one bearing member having a projection extending axially through the other bearing member and in its extension and being interlocked therewith, and a rod having an eye bridging and surrounding said reduced portion formed by said extensions of the end bearing members and lying between and in contact with said end bearing members, said eye having a wall thickness materially less than the diameter of the reduced portion of the wrist-pin which it encloses, said end bearing members and eye presenting a continuous outer bearing surface of like radius throughout for engagement with the bearing surface of the bore.

In testimony whereof I affix my signature.

JOSEPH KUHNE.